US012330277B2

(12) United States Patent
Lapp

(10) Patent No.: US 12,330,277 B2
(45) Date of Patent: Jun. 17, 2025

(54) SCREW CLAMP

(71) Applicant: CNC-Technik LAPP GmbH, Neuburg a.d. Donau (DE)

(72) Inventor: Albert Lapp, Buxheim (DE)

(73) Assignee: CNC-Technik LAPP GmbH, Neuburg A.D. Donau (DE)

(*) Notice: Subject to any disclaimer, the term of this patent is extended or adjusted under 35 U.S.C. 154(b) by 505 days.

(21) Appl. No.: 17/797,800

(22) PCT Filed: Jan. 20, 2021

(86) PCT No.: PCT/EP2021/051150
§ 371 (c)(1),
(2) Date: Aug. 5, 2022

(87) PCT Pub. No.: WO2021/156053
PCT Pub. Date: Aug. 12, 2021

(65) Prior Publication Data

US 2023/0150095 A1 May 18, 2023

(30) Foreign Application Priority Data

Feb. 5, 2020 (DE) ..................... 10 2020 102 910.1

(51) Int. Cl.
*B25B 5/16* (2006.01)
*B25B 5/10* (2006.01)

(52) U.S. Cl.
CPC .............. *B25B 5/166* (2013.01); *B25B 5/101* (2013.01); *B25B 5/102* (2013.01)

(58) Field of Classification Search
CPC ........... B25B 5/101; B25B 5/102; B25B 5/16; B25B 5/166
(Continued)

(56) References Cited

U.S. PATENT DOCUMENTS 24,194 A 5/1859 Clackson et al.
1,587,820 A 6/1926 Carter
(Continued)

FOREIGN PATENT DOCUMENTS

DE 8214309 U1 8/1982
DE 8903875 U1 2/1990
(Continued)

*Primary Examiner* — Eric J Rosen
*Assistant Examiner* — Aaron R McConnell
(74) *Attorney, Agent, or Firm* — Laurence A. Greenberg; Werner H. Stemer; Ralph E. Locher

(57) ABSTRACT

A screw clamp has two clamping arms, between which a workpiece is clamped. In a clamping process, at least one of the clamping arms is moved by an axial movement distance by a clamping unit such that a clamping force acting against the workpiece is built up, which clamping unit can be manually rotationally actuated about an axis of rotation. The clamping unit is a threaded drive containing a radially outer adjustment sleeve which has an internal screw thread and a radially inner threaded stroke element, the external screw thread of which is in thread engagement with the adjustment sleeve internal screw thread and which can be brought into force-transmitting connection with the movable clamping arm. In the clamping process, the adjustment sleeve is rotationally actuated, whereby the threaded stroke element, together with the clamping arm connected thereto, is moved against the workpiece by the axial movement distance.

11 Claims, 5 Drawing Sheets

(58) Field of Classification Search
USPC .......................................... 269/149, 203, 249
See application file for complete search history.

(56) References Cited

U.S. PATENT DOCUMENTS

| | | | | | |
|---|---|---|---|---|---|
| 3,414,909 | A * | 12/1968 | Provi | ..................... | A47K 3/003 4/577.1 |
| 6,296,241 | B1 * | 10/2001 | Harrison | ................... | B25B 5/10 269/182 |
| 6,481,767 | B2 * | 11/2002 | Pool | .................... | H01M 50/256 294/903 |
| 2018/0243886 | A1 | 8/2018 | Lucas | | |

FOREIGN PATENT DOCUMENTS

| | | | |
|---|---|---|---|
| DE | 29800132 | U1 | 4/1998 |
| EP | 3168386 | A1 | 5/2017 |
| FR | 590769 | A | 6/1925 |

* cited by examiner

SCREW CLAMP

FIELD AND BACKGROUND OF THE INVENTION

The invention relates to a screw clamp according to the preamble of the independent claim.

DE 82 14 309 U1 describes a generic screw clamp with an adjustable clamping arm and a fixed clamping arm between which a workpiece can be clamped. The fixed clamping arm has a threaded flange with an internal thread, which is in threaded engagement with a threaded spindle with pressure plate facing the adjustable clamping arm. The adjustable clamping arm has a slide rail which, in the unclamped state, can be guided smoothly in a loose fit through a recess in the fixed clamping arm. To prevent slipping, the slide rail of the adjustable clamping arm has a corrugation which, when the slide rail is tilted, cants with a counter-contour of the recess formed in the fixed clamping arm.

In the prior art, the pressure plate of the fixed clamping arm and the adjustable clamping arm are first brought into contact with the intermediate workpiece for a clamping process. This is followed by a rotary actuation of the threaded spindle, which builds up a clamping force acting against the workpiece.

In the above DE 82 14 309 U1, the threaded spindle together with the pressure plate is positioned laterally offset from the slide rail of the adjustable clamping arm by a lever arm length. Depending on the workpiece geometry, such a screw clamp setup can have interfering contours.

SUMMARY OF THE INVENTION

The object of the invention is to provide a screw clamp that is functionally extended compared to the prior art and, in particular, provides an alternative screw clamp structure for special workpiece geometries.

The object of the invention is solved by the features of the independent claim. Preferred further embodiments of the invention are disclosed in the dependent claims.

The invention is based on a screw clamp in which at least one of the two clamping arms is adjustable by an axial adjustment path by means of a clamping unit which is manually rotatable about an axis of rotation. During a clamping process, a clamping force acting on the workpiece is built up. According to the characterizing part of the independent claim, the clamping unit is realized as a threaded drive. This has a radially outer adjusting sleeve with at least one internal thread and with at least one radially inner threaded stroke element. The threaded stroke element is in threaded engagement with the internal thread of the adjusting sleeve by means of its external thread. In addition, the radially inner threaded stroke element is connectable to the adjustable clamping arm in a force-transmitting manner (in particular via an anti-slip device). During a clamping process, the adjusting sleeve is rotationally actuated. As a result of the rotary actuation of the adjusting sleeve, the threaded stroke element together with the clamping arm connected to it is adjusted against the workpiece by the axial adjustment path while tension is built up.

In a first embodiment, the threaded stroke element can be firmly connected to the adjustable clamping arm. However, it is preferable if the adjustable clamping arm has a slide rail which, in the unclamped state, can be guided smoothly and adjustably through a recess in the radially inner threaded stroke element. The slide rail of the adjustable clamping arm can have a corrugation to prevent slipping. If the slide rail is tilted, it can cant with a counter-contour of the recess formed in the threaded stroke element. The recess can be built axially continuous in the threaded stroke element.

In the above embodiment, only one clamping arm can be adjusted by means of the adjusting sleeve. In contrast, in the following second embodiment, it is preferred if the two clamping arms can each be adjusted by an axial adjustment path when the adjusting sleeve is rotated. In order to realize such an adjustment kinematics, the adjusting sleeve can have a first internal thread (e.g. right-hand thread) and an axially adjacent second internal thread in the opposite direction (e.g. left-hand thread). These are respectively threadedly engaged with a first threaded stroke element and with a second threaded stroke element. The first threaded stroke element and the second threaded stroke element can each be connected in a force-transmitting manner to one of the adjustable clamping arms. The clamping arms can each be positioned on axially opposite end faces of the adjusting sleeve.

During a clamping process, the two threaded stroke elements can each be moved towards each other by an adjustment path by means of rotary actuation of the adjusting sleeve. Conversely, when the adjusting sleeve is rotated in the opposite direction, the two threaded stroke elements can each be moved away from each other by an adjustment path.

In a technical implementation, the slide rail of the first adjustable clamping arm guided through the recess of the first threaded stroke element can extend beyond the first threaded stroke element with a slide rail projection. In this case, the slide rail projection may provide an interfering contour for the adjacent second threaded stroke element. Against this background, the second threaded stroke element can have a clearance into which the slide rail projection can project without interfering contours.

Conversely, the slide rail of the second adjustable clamping arm, which is guided through the recess of the second threaded stroke element, can also extend beyond the second threaded stroke element with a slide rail projection. In this case, the slide rail protrusion may form an interfering contour for the first threaded stroke element. Against this background, the first threaded stroke element can also have a clearance into which the slide rail projection can project without interfering contours.

The clearance in the first threaded stroke element and/or in the second threaded stroke element can be dimensioned in such a way that the clearance does not form an interfering contour during a tilting movement of the slide rail into its inclined position, in which the slide rail corrugation cants with the counter-contour of the recess in the respective threaded stroke element, in order to realize a slip protection. In a technical implementation, the recess of one threaded stroke element may be aligned in axial alignment with the clearance of the other threaded stroke element. It is preferable if the clearance cross-section in the respective threaded stroke element is substantially larger than the recess cross-section.

With regard to increased functionality of the screw clamp, it is preferred if a threaded flange provided with an internal thread is formed on at least one of the clamping arms. This can be in threaded engagement with a threaded spindle with pressure plate. The pressure plate can face the other clamping arm. During the clamping process, the pressure plate of the threaded spindle can be stroke-adjusted for additional tension buildup by rotating the spindle.

An example of an embodiment of the invention is described below with reference to the accompanying figures.

DETAILED DESCRIPTION OF THE INVENTION

Figure 1:
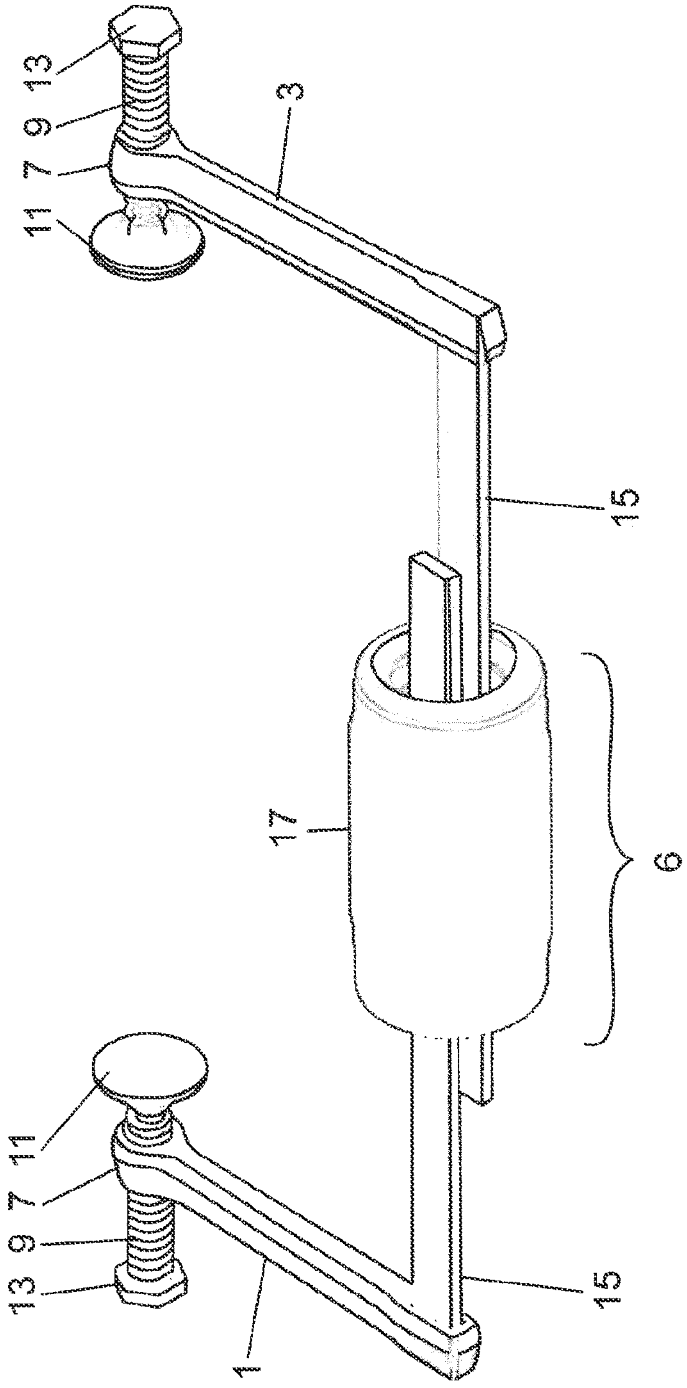
FIGS. 1 and 2 the screw clamp in a construction position in different representations.
Figure 2:
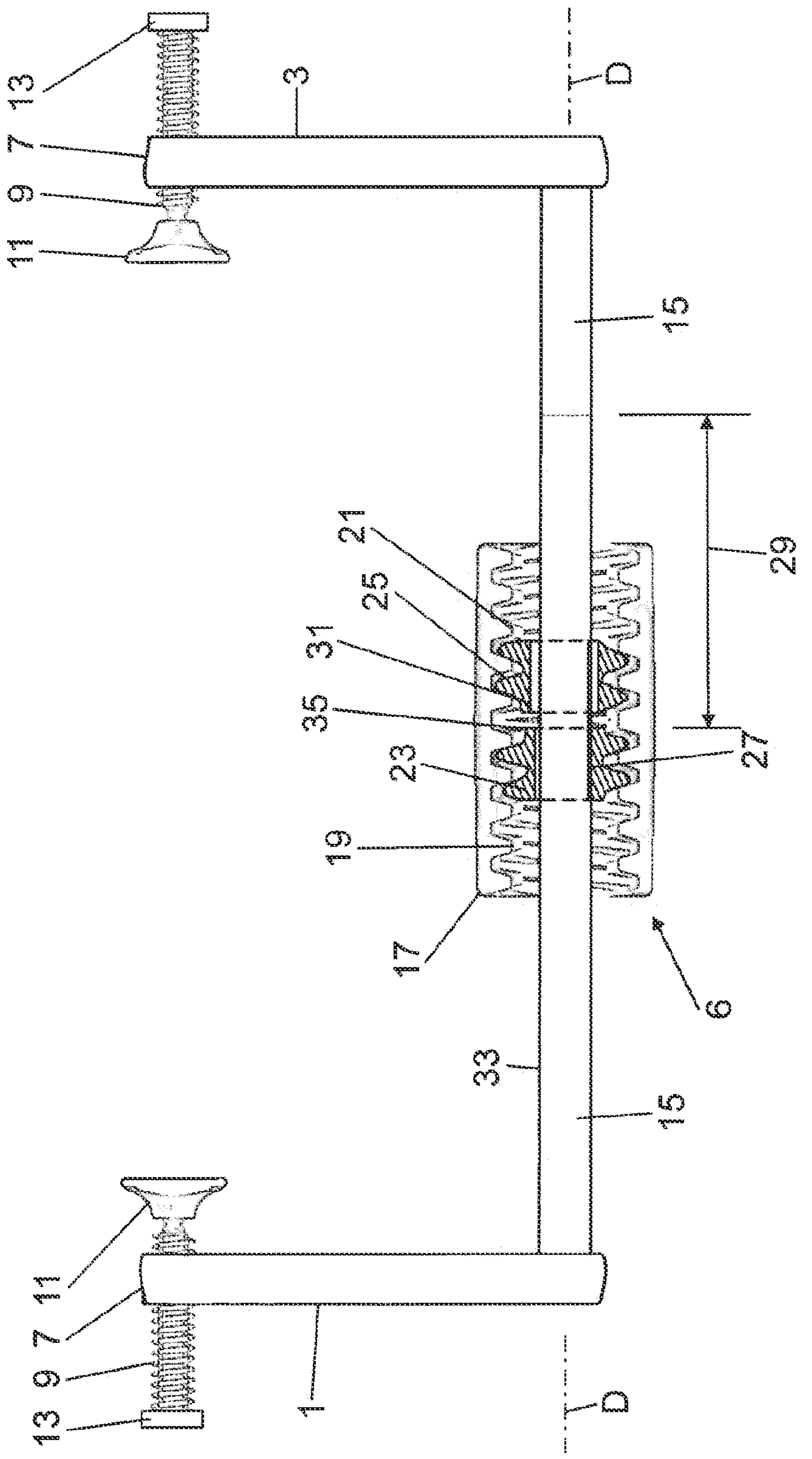

In FIGS. 1 and 2, the screw clamp is shown in a non-clamped construction position. Accordingly, the screw clamp has two adjustable clamping arms 1, with an intermediate clamping unit 6. In FIG. 1 or 2, each of the two clamping arms 1, 3 has a threaded flange 7 provided with an internal thread, which is in threaded engagement with a threaded spindle 9 with pressure plate 11, each of which faces the opposite clamping arm.

A workpiece 5 (FIG. 5) can be clamped between the two clamping arms 1, 3. For a clamping process, the two clamping arms 1, 3 can be adjusted by an axial adjustment path $\Delta a_1$, $\Delta a_2$ (FIG. 5) by means of the clamping unit 6, which can be manually rotated about a rotation axis D (FIG. 2), whereby the pressure plates 11 of the two clamping arms 1, 3 are pressed against the workpiece 5 and a clamping force is built up acting against the workpiece 5. A tool attachment 13 for rotary actuation of the threaded spindle 9 is formed at the end of the threaded spindle opposite the pressure plate 11.

In FIGS. 1 and 2, the two clamping arms 1, 3 are each formed with slide rails 15 extending in an axial direction through the clamping unit 6.

The structure of the clamping unit 6 is described below with reference to FIG. 3: Accordingly, the clamping unit 6 is realized as a threaded drive, which has a radially outer adjusting sleeve 17 with a first internal thread 19 (e.g. right-hand thread) and with an axially directly adjacent, opposite second internal thread 21 (e.g. left-hand thread). Each of the two adjusting sleeve internal threads 19, 21 is in threaded engagement with a first threaded stroke element 23 as well as with a second threaded stroke element 25.

Figure 3:
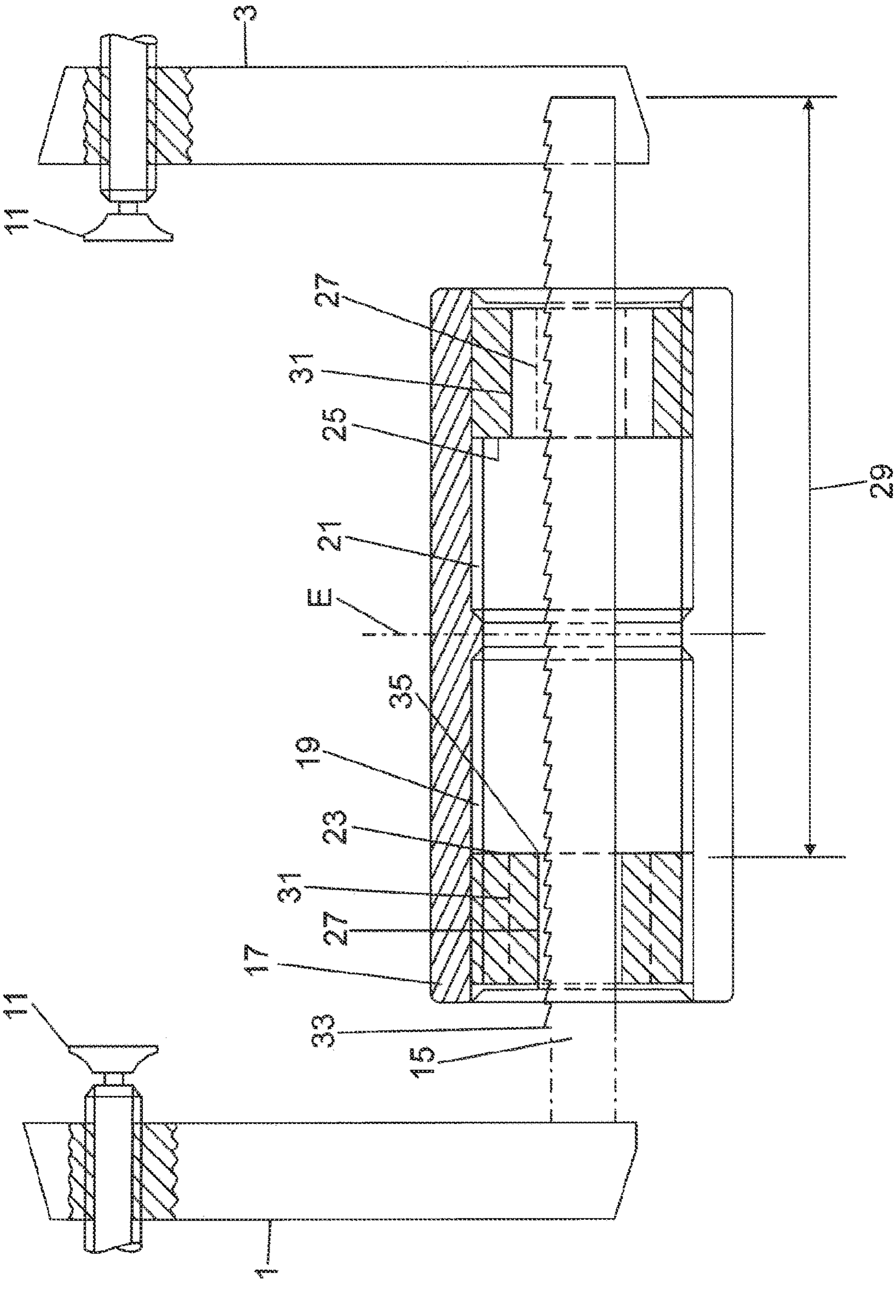
FIG. 3 the screw clamp in a schematic side section view.

In FIG. 3, the screw clamp is shown in the unclamped state. Accordingly, the two slide rails 15 (only one slide rail 15 is shown in FIG. 3) of the left-hand, first clamping arm 1 are guided smoothly adjustably in a loose fit through a recess 27 of the left-hand, first threaded stroke element 23. The slide rail 15 extends in the further course with a slide rail projection 29 beyond the first, left-hand threaded stroke element 23. In FIG. 3, the slide rail projection 29 extends without interfering contour through a clearance 31 of the second, right-hand threaded stroke element 25.

Similarly, the slide rail 15 of the second clamping arm 3 on the right side, which is not shown in FIG. 3, is guided smoothly and adjustably in a loose fit through a recess 27 of the second threaded stroke element 25 on the right side. In this case, the slide rail 15 extends further (to the left in FIG. 3) with a slide rail projection 29 (not shown in FIG. 3) beyond the second, right-hand threaded stroke element 25. The slide rail projection 29 also projects without interfering contour through a clearance 31 (not shown in FIG. 3), which is formed in the first, left-hand threaded stroke element 23.

In FIG. 3, the slide rail 15 of the left-hand, first clamping arm 1 has a corrugation 33 to provide anti-slip protection. When the slide rail 15 is tilted (FIG. 5), the corrugation 33 cants with a counter-contour 35 of the recess 27 formed in the first threaded stroke element 23. In the same way, an anti-slip device is also provided between the slide rail 15 of the second clamping arm on the right and the second threaded stroke element 25.

Figure 4:
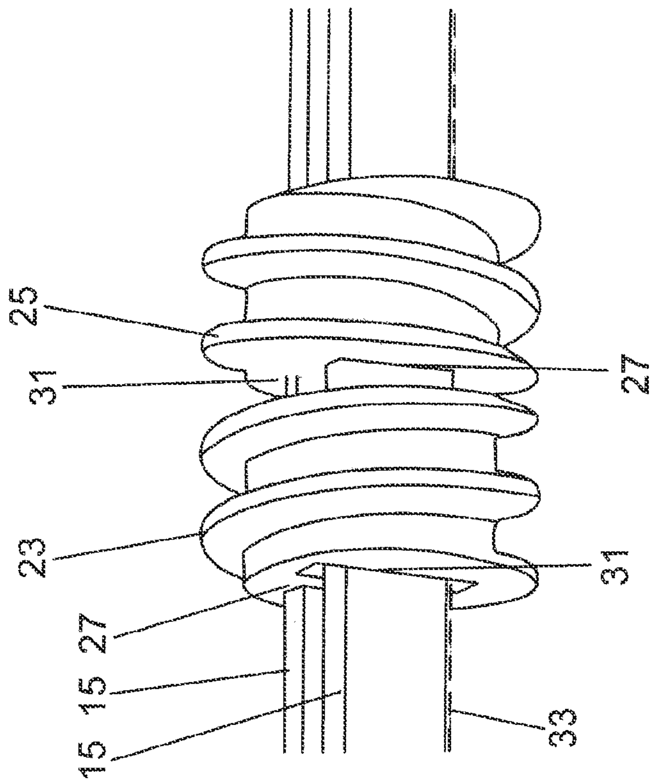
FIG. 4 a detailed view of the screw clamp.
Figure 5:
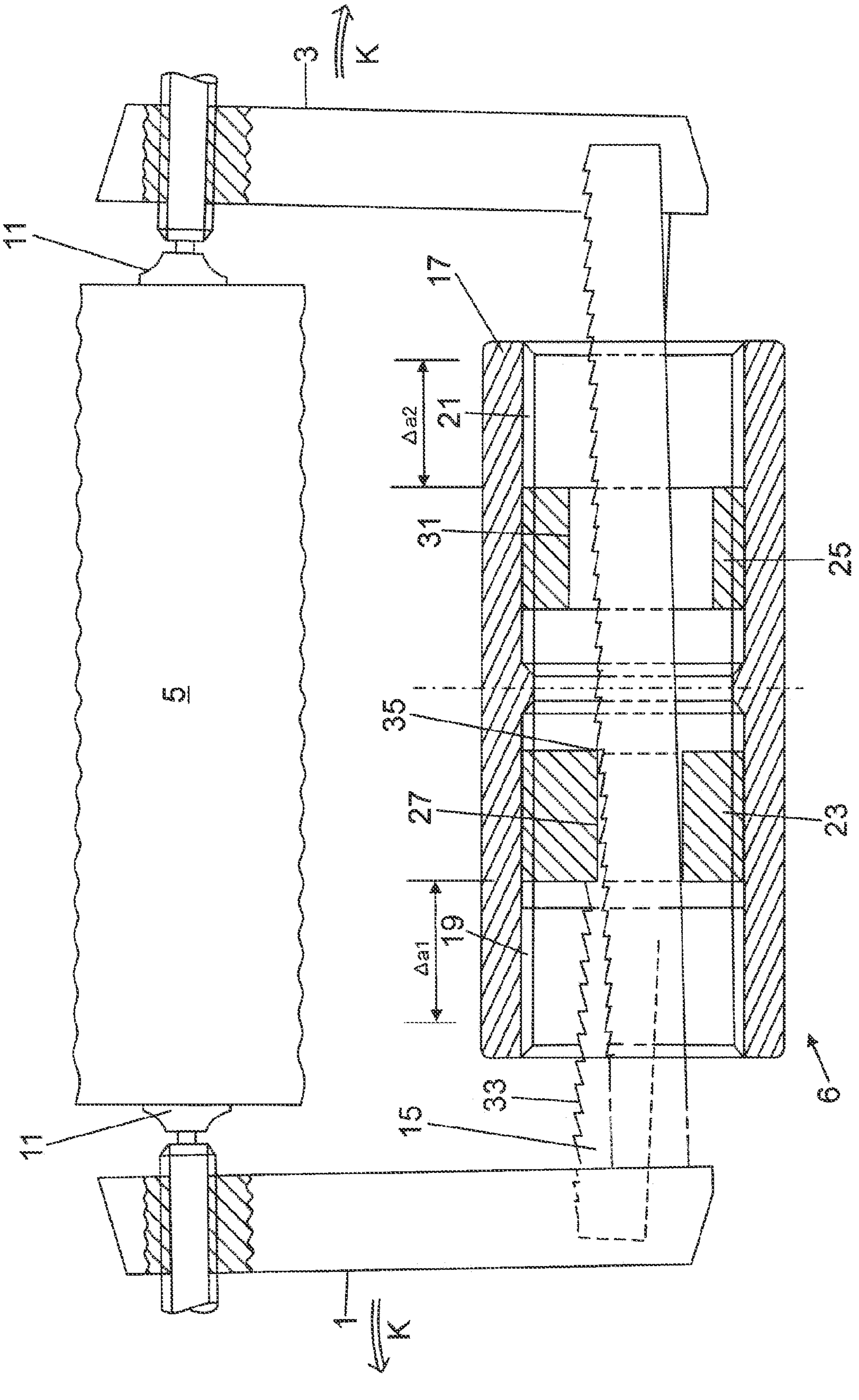
FIG. 5 in a view corresponding to FIG. 3, the screw clamp in the clamped position.

As indicated in the detailed view of FIG. 4, both the first threaded stroke element 23 and the second threaded stroke element 25 each have a recess 27 and a clearance 31. The recess 27 of one of the threaded stroke elements 23 is aligned in axial alignment with the clearance 31 of the other threaded stroke element 25. In addition, the clearance 31 in one threaded stroke element 23 is dimensioned so large that it does not represent an interfering contour during a tilting movement K of the slide rail 15 into its inclined position (FIG. 5). In the inclined position (FIG. 5), the slide rail corrugation 33 cants with the counter contour 35 of the recess 27 in the respective threaded stroke element 23, 25 in order to realize a slip protection.

For a clamping process, the workpiece 5 is first positioned between the two pressure plates 11 of the clamping arms 1, 3. Then the two clamping arms 1, 3, which have not yet tilted, are pressed smoothly into contact with the workpiece 5. This causes a slight tilting movement K (FIG. 5) of the two clamping arms 1, 3, whereby the slide rail corrugations 33 cants with the corresponding counter contours 35 of the two threaded stroke elements 23, 25. As a result, the respective clamping arm 1, 3 is frictionally connected to the associated threaded stroke element 23, 25.

Subsequently, the adjusting sleeve 17 is rotated, causing the two threaded stroke elements 23, 25 to move towards each other from their initial position (FIG. 3) by the adjustment path $\Delta a_1$, $\Delta a_2$ (shown exaggeratedly large in FIG. 5), while building up a clamping force acting on the workpiece 5.

REFERENCE SIGNS

1, 3 clamping arms
5 workpiece
6 clamping unit
7 threaded flange
9 threaded spindle
11 pressure plate
13 tool attachment
15 slide rails
17 adjusting sleeve
19 first internal thread
21 second internal thread
23 first threaded stroke element
25 second threaded stroke element
27 recess
29 slide rail projection
31 clearance
33 corrugation
35 counter-contour
D rotation axis
E adjusting sleeve center cross plane
$\Delta a_1$, $\Delta a_2$ axial adjustment paths
K tilting movement

The invention claimed is:

1. A screw clamp, comprising:

a clamping unit;

a slide rail;

two clamping arms between which a workpiece is clampable, wherein in a clamping process at least one of said clamping arms is adjustable along an axial adjustment path by means of said clamping unit which is manually rotatable about an axis of rotation, by building up a clamping force acting against the workpiece;

said clamping unit containing a threaded drive having a radially outer adjusting sleeve with at least one internal thread and radially inner threaded stroke elements including a first threaded stroke element and a second threaded stroke element, at least one of said radially inner threaded stroke elements having an external thread being in threaded engagement with said at least one internal thread of said radially outer adjusting sleeve and is bringable into force-transmitting connection with said clamping arms, and in that in the clamping process said radially outer adjusting sleeve is rotationally actuated, whereby at least one of said radially inner threaded stroke elements together with a clamping arm of said clamping arms connected thereto is displaced against the workpiece along the axial adjustment path, at least one of said radially inner threaded stroke elements having a recess formed therein;

the force-transmitting connection between said clamping arm being an adjustable clamping arm and said at least one radially inner threaded stroke element is provided by said slide rail connected to said adjustable clamping arm, in that said slide rail, in an unclamped state, is guidable in a loose fit in a smoothly movable manner through said recess in said at least one radially inner threaded stroke element;

said slide rail has, as an anti-slip device, a corrugation which, in a case of an oblique position of said slide rail, cants with a counter-contour of said recess formed in said at least one radially inner threaded stroke element; and said two clamping arms are each adjustable along the axial adjustment path upon a rotary actuation of said clamping unit, and that said at least one internal thread of said radially outer adjusting sleeve includes a first internal thread and an axially adjacent, opposite second internal thread, which are each in threaded engagement with said first threaded stroke element and with said second threaded stroke element.

2. The screw clamp according to claim 1, wherein said first threaded stroke element and said second threaded stroke element are each connectable in a force-transmitting manner to one of said clamping arms.

3. The screw clamp according to claim 1, wherein said two clamping arms are positioned in an axial direction on opposite adjusting sleeve end faces, and during the clamping process by means of the rotary actuation of said radially outer adjusting sleeve, said first and second threaded stroke elements are each moveable towards or away from one another along the adjustment path.

4. The screw clamp according to claim 1, wherein said first internal thread and said axially adjacent, opposite second internal thread of said radially outer adjusting sleeve merge directly into one another in an axial direction.

5. The screw clamp according to claim 1, wherein: said first threaded stroke element has a first recess and a first clearance formed therein;

said second threaded stroke element has a second recess and a second clearance formed therein;

said clamping arms include a first adjustable clamping arm having a first slide rail guided through said first recess of said first threaded stroke element and extends with a first slide rail projection beyond said first threaded stroke element; and said second threaded stroke element has said second clearance into which said first slide rail projection projects without interference, and conversely, said clamping arms include a second adjustable clamping arm having a second slide rail, said second slide rail is guided through said second recess of said second threaded stroke element, and extends with a second slide rail projection beyond said second threaded stroke element, and in that said first threaded stroke element has said first clearance into which said second slide rail projection projects without interference contour.

6. The screw clamp according to claim 5, wherein:

said first and second slide rails each have a slide rail corrugation; and said first clearance in said first threaded stroke element and said second clearance in said second threaded stroke element are dimensioned in such a way that said first clearance and said second clearance do not form an interfering contour with said first and second slide rails during a tilting movement of said first and second slide rails into an inclined position, in which said slide rail corrugation cants with a counter contour of said first recess and/or of said second recess in one of said first and second threaded stroke elements for providing slip protection.

7. The screw clamp according to claim 5, wherein said first or second recess of one of said first and second threaded stroke elements is aligned in axial alignment with said first or second clearance of another of said first and second threaded stroke elements.

8. The screw clamp according to claim 1, further comprising a threaded spindle having a pressure plate; and wherein on at least one of said clamping arms a threaded flange with an internal thread is formed, which is in threaded engagement with said threaded spindle with said pressure plate facing another of said clamping arms.

9. The screw clamp according to claim 1, wherein said recess passes axially through said at least one radially inner threaded stroke element.

10. The screw clamp according to claim 1, wherein said first internal thread and said axially adjacent, opposite second internal thread of said radially outer adjusting sleeve merge directly into one another in an axial direction at a center cross plane.

11. The screw clamp according to claim 8, wherein during the clamping process, said pressure plate of said threaded spindle is adjustable for an additional build-up of force by rotational actuation of said threaded spindle, and said threaded spindle with said pressure plate is positioned axis-parallel at an axial distance from the axis of rotation of said radially outer adjusting sleeve.

* * * * *